United States Patent
Guillou et al.

(10) Patent No.: US 11,618,082 B2
(45) Date of Patent: Apr. 4, 2023

(54) FLOORING AND DEVICE AND METHODS ASSOCIATED WITH SAME

(71) Applicant: COMPAGNIE GENERALE DES ETABLISSEMENTS MICHELIN, Clermont-Ferrand (FR)

(72) Inventors: Melaine Guillou, Clermont-Ferrand (FR); Florian Bremond, Clermont-Ferrand (FR); Andre-Clement Gaucerand, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 91 days.

(21) Appl. No.: 16/955,475

(22) PCT Filed: Dec. 18, 2018

(86) PCT No.: PCT/FR2018/053357
§ 371 (c)(1),
(2) Date: Jun. 18, 2020

(87) PCT Pub. No.: WO2019/122673
PCT Pub. Date: Jun. 27, 2019

(65) Prior Publication Data
US 2020/0371016 A1    Nov. 26, 2020

(30) Foreign Application Priority Data
Dec. 18, 2017   (FR) ...................................... 1762352

(51) Int. Cl.
*G01N 19/02*    (2006.01)
*B23K 26/342*   (2014.01)
(Continued)

(52) U.S. Cl.
CPC .............. *B22F 10/62* (2021.01); *B22F 10/20* (2021.01); *B22F 10/66* (2021.01); *B23K 26/342* (2015.10);
(Continued)

(58) Field of Classification Search
None
See application file for complete search history.

(56) References Cited

U.S. PATENT DOCUMENTS

2006/0134424 A1*   6/2006  Plissonnier ............. C23C 16/26
                                                        428/408
2009/0081433 A1    3/2009  Lucas et al.
2016/0214904 A1*   7/2016  Sandstrom .............. C04B 37/00

FOREIGN PATENT DOCUMENTS

WO       2007/085494 A1    8/2007

OTHER PUBLICATIONS

"Titanium Alloy TA6V," Aubert and Duval (Year: 2021).*
(Continued)

*Primary Examiner* — David Sample
(74) *Attorney, Agent, or Firm* — Venable LLP (57) ABSTRACT

Ground surface comprising a substrate (110) having a Young's modulus of between 100 and 1000 GPa, and in which the ground surface has, on a working surface (120), a Vickers hardness of between 1300 and 10 000 kgf/mm$^2$, and/or a surface coating forming the working surface, in which the surface coating contains amorphous carbon and/or titanium nitride and/or chromium nitride and/or tungsten carbide.

19 Claims, 4 Drawing Sheets

(51) Int. Cl.
*B23K 26/354* (2014.01)
*C23C 26/00* (2006.01)
*B28B 1/00* (2006.01)
*B22F 10/62* (2021.01)
*C04B 41/50* (2006.01)
*B22F 10/20* (2021.01)
*B22F 10/66* (2021.01)

(52) U.S. Cl.
CPC ............ *B23K 26/354* (2015.10); *B28B 1/001* (2013.01); *C04B 41/5057* (2013.01); *C04B 41/5062* (2013.01); *C04B 41/5068* (2013.01); *C23C 26/00* (2013.01); *G01N 19/02* (2013.01)

(56) References Cited

OTHER PUBLICATIONS

"Young's Modulus of Steel," Amesweb.com, (Year: 2018).*
"Tungsten Carbide—An Overview," Azom.com (Year: 2011).*
SUS304 Stainless Steel—An Overview, https://www.meadinfo.org/2010/09/sus304-stainless-steel-material.html (no author) (Year: 2010).*
"Characteristics of Kyocera Technical Ceramics", retrieved from the internet: URL:http://americas.kyocera.com/kicc/pdf/Kyocera Material Characteristics.pdf [retrieved on Oct. 28, 2014], p. 3 (2004).
International Search Report dated Feb. 8, 2019, in corresponding PCT/FR2018/053357 (4 pages).

* cited by examiner

FLOORING AND DEVICE AND METHODS ASSOCIATED WITH SAME

FIELD OF THE INVENTION

The invention relates to a ground surface, particularly a test surface, and to an associated manufacturing method. The invention also relates to a device, particularly a test device, and an associated method.

PRIOR ART

Ground surfaces, particularly road surfaces, are used to design and test novel materials and products which are intended to be used on ground surfaces, for example with a view to manufacturing tyre components.

Thus, during the design of part of a tyre, for example a material for a tread of a tyre, characterizing its behaviour under stress loading, for example under driving or braking torque, or under cornering, or with a ground/tyre differential slip, is important.

Tests on outdoor tracks, for example on braking tracks, are relatively costly, lengthy, and make it difficult to take long-term tyre wear into account.

That being so, measures may seek to reproduce, in a laboratory, on a tribotester, the friction between the part of the tyre, for example made of rubber, and the road surface, responsible for a large proportion of the force generated in the contact patch in which the tyre is in contact with the road surface.

Now, known ground surfaces do not allow measurements to be taken in a laboratory that are representative of behaviour on a road surface.

This is because it is found that the grip coefficients measured on laboratory test devices such as tribotesters are substantially lower than those on road surfaces, typically by a factor of two.

SUMMARY OF THE INVENTION

It is an object of the invention to provide a ground surface that makes it possible to alleviate these disadvantages. One object of the invention is to provide a ground surface for laboratory tests which is capable of representing the characteristics of a road surface and which is robust enough for repeated use.

To this end, there is provided a ground surface comprising a substrate having a Young's modulus of between 100 and 1000 GPa, preferably between 100 and 500 GPa, and in which the ground surface has, on a working surface, a Vickers hardness of between 1300 and 10 000 kgf/mm$^2$, preferably between 1500 and 3500 kgf/mm$^2$. Alternatively or in addition, for this purpose, there is provided a ground surface comprising a substrate having a Young's modulus of between 100 and 1000 GPa, preferably between 100 and 500 GPa, comprising a surface coating forming a working surface, in which the surface coating contains amorphous carbon and/or titanium nitride and/or chromium nitride and/or tungsten carbide It is thus possible to obtain a ground surface which has the desired characteristics, for example those of a road surface, and which can be tested repeatedly while maintaining its friction characteristics despite such repeated use, thereby making it possible to ensure the relevance of the tests performed.

The invention is advantageously supplemented by the following features, considered alone or in any technically feasible combination thereof:
  a surface coating forming the working surface,
  the surface coating contains amorphous carbon and/or titanium nitride and/or chromium nitride and/or tungsten carbide,
  the surface coating has a thickness of between 0.1 and 100 µm, preferably between 2 and 5 µm,
  the substrate has a Young's modulus of between 100 and 500 GPa,
  the ground surface has, on the working surface, a Vickers hardness of between 1500 and 3500 kgf/mm$^2$,
  the substrate contains stainless steel and/or tungsten carbide and/or ceramic,
  the mean depth of the texture on a working surface of the ground surface is comprised between 0.3 and 1.7 mm,
  the coefficient of grip between a rubber and the ground surface on the working surface is between 0.5 and 2.

The invention also relates to a test device for testing a component, comprising:
  such a ground surface, and
  means for pressing the component against the ground surface and for creating relative movement between the component and the ground surface.

The invention is advantageously supplemented by the following features, considered alone or in any technically feasible combination thereof:
  the device is a rolling device,
  the device is a tribotester.

The invention also relates to a method for manufacturing such a ground surface, comprising a step of obtaining the substrate.

The invention is advantageously supplemented by the following features, considered alone or in any technically feasible combination thereof:
  a step of generating a relief on the substrate,
  a step of generating a relief on the substrate by additive manufacturing, for example using ceramic,
  a step of generating the relief by machining, for example by laser machining,
  the laser machining is laser machining of a solid lump containing tungsten carbide,
  the laser machining is laser machining of a solid lump containing stainless steel,
  a step of generating the relief by surface laser melting using a stainless steel powder,
  a surface treatment step involving a step of forming the surface coating that forms the working surface,
  the step of obtaining the substrate further comprises a step of modulating the relief generated.

The invention also relates to a method for testing a component by means of such a device, involving pressing the component onto the ground surface and/or creating relative movement between the component and the ground surface.

BRIEF DESCRIPTION OF THE FIGURES

Further features and advantages of the invention will become apparent from the following description of some embodiments. In the attached drawings.

DETAILED DESCRIPTION OF THE INVENTION

Manufacturing Method

Figures 2, 3, 4:
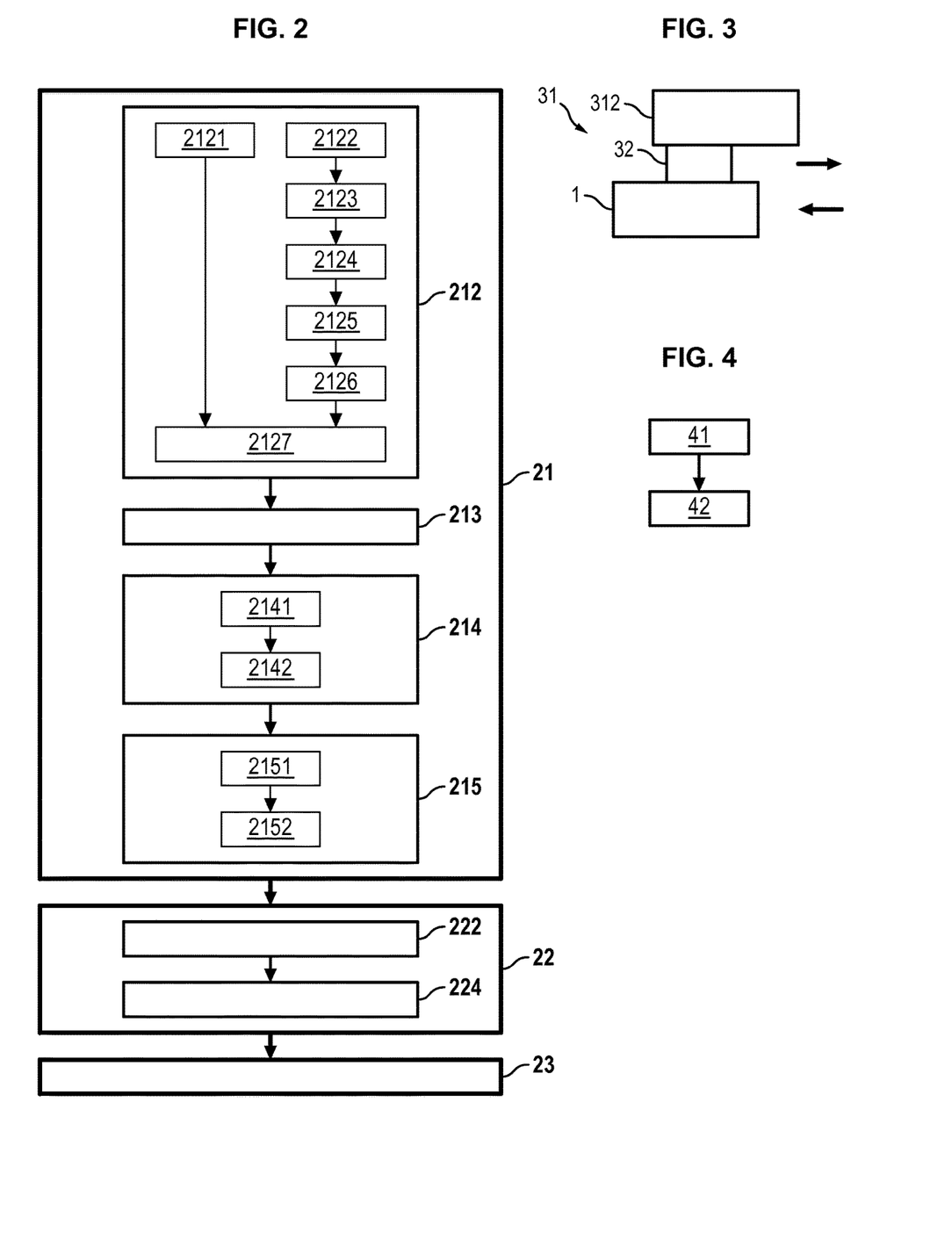
FIG. 2 depicts a method of manufacture according to one exemplary embodiment of the invention.
FIG. 3 depicts a device according to one exemplary embodiment of the invention.
FIG. 4 depicts a test method according to one exemplary embodiment of the invention.

A method for manufacturing a ground surface, for example a ground surface as described hereinbelow, is described with reference to FIG. 2.

Generation of a Substrate

The method comprises a step 21 of obtaining a substrate 110, for example a substrate 110 as described hereinbelow. The step of obtaining the substrate 110 may be a step of generating the substrate 110 or of sourcing the substrate 110.

The step 21 may comprise a step 212 of determining a relief that is to be reproduced. The relief may be defined as being a non-planar texture, for example such as variations in altitude, for example with respect to a midplane. The relief that is to be reproduced may be a macro-relief. The macro-relief may be defined with respect to a micro-relief. Alternatively or in addition, the macro-relief may be defined as being the relief that can be measured with the precision of a texture mean depth measurement, for example as described hereinbelow. The macro-relief may correspond to a relief having a characteristic size of the order of 1 centimetre, for example of centimetre-scale.

It is thus possible to determine the relief that is to be obtained for the ground surface.

The step 212 may comprise a step 2121 of obtaining data relating to a relief that is to be reproduced, for example using data processing means, for example a data processing unit, for example a processor. The data relating to a relief that is to be reproduced may thus be stored beforehand, for example in storage means, for example a storage unit, for example a memory. The data relating to a relief that is to be reproduced are thus available without the need to make additional measurements beforehand.

Alternatively or in addition, the step 212 may comprise a step 2122 of obtaining a reference ground surface. The step 2122 of obtaining a reference ground surface may be a step of manufacturing a reference ground surface.

Figure 5A:
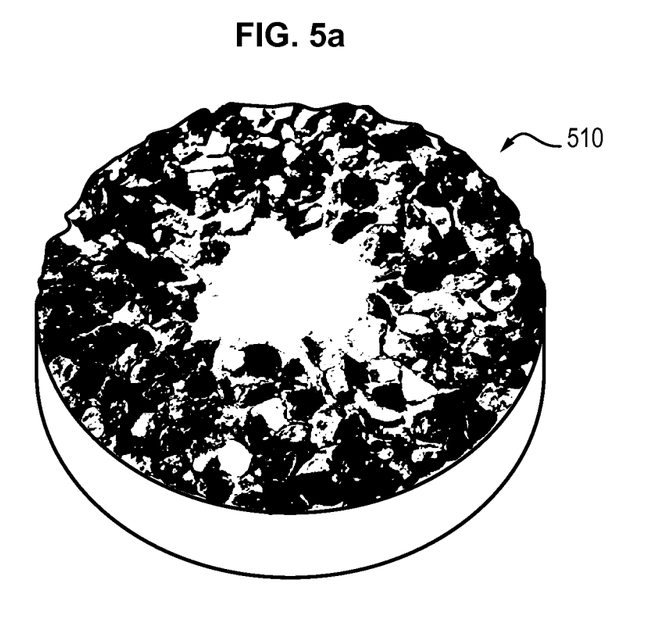
FIG. 5a depicts a reference ground surface according to one exemplary embodiment of the invention.

A reference ground surface is described with reference to FIG. 5a. The reference ground surface may contain chippings. The chippings may be chippings of crushed natural rocks and/or of a size of around 1 cm. Such a reference ground surface structure displays good ability to withstand polishing and highly small-scale aggressiveness as a result of its relief, being far beyond the characteristics that the natural rock might be able to display.

The reference ground surface may be a core sample of roadway. The roadway may be a road surface, for example an outdoor road surface. The road surface may contain concrete and/or bitumen and/or crushed natural rock. Step 2122 may thus involve taking a core sample of roadway. The core-sampling of the roadway may involve taking a sample of the road surface. The reference ground surface is, for example, a ground surface of mosaic type, which means to say that it comprises at least one part in which the chippings are placed adjacent to one another, such a ground surface being particularly well-suited to use with a tribotester.

The reference ground surface may thus form a new model of a relief that is to be reproduced on the ground surface.

The reference ground surface may comprise a textured ring 510. The ring 510 may comprise the relief that is to be reproduced. The ring 510 may be positioned and/or may extend between a radius of 21 mm and a radius of 48 mm. Such dimensions may be suited to the sizes of tribotester test specimen for such applications. The tribotester may be a tribotester allowing rotation dynamics or a linear tribotester.

The step 212 may comprise a step 2123 of measuring a relief of the reference ground surface, for example the relief that is to be reproduced. It is thus possible to obtain an image of the surface of the reference ground surface. The step 2123 may be carried out using a profilometer, for example optical profilometer, for example by projecting structured light and/or by interferometry and/or by confocal measurement. The profilometer may comprise a sensor having a field size of the order of 10×10 cm, for example a sensor having a resolution of 100 µm. The profilometer is, for example, a profilometer of the µsurf expert model, as marketed by Nanofocus. At the end of step 2123, a relief of the reference ground surface measured can be obtained, for example in the form of data corresponding to the measurements taken of the relief of the reference ground surface.

Figure 5B:
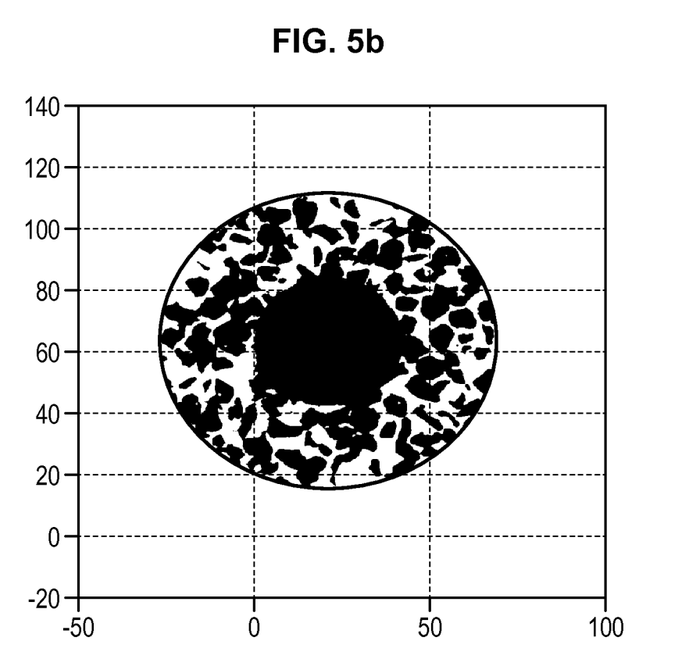
FIG. 5b depicts a relief of the reference ground surface processed according to one exemplary embodiment of the invention, and, FIG. 5c depicts the relief of the reference ground surface of FIG. 5b converted according to one exemplary embodiment of the invention.

Step 212 may comprise a step 2124 of processing data pertaining to the relief of the reference ground surface measured in step 2123. Step 2124 may involve recombining the relief of the reference ground surface measured in step 2123. Step 2124 may involve a filtering of the relief of the reference ground surface measured in step 2123, for example low-pass filtering, for example low-pass filtering with a cut-off wavelength of 300 µm, for example sliding-window spatial filtering, for example sliding-window spatial filtering with a window size of 300 µm. Step 2124 may involve a straightening of the relief of the reference ground surface measured in step 2123, for example a rotation of a plane of the relief, for example of a mean plane, it being possible for the mean plane to be a mean plane of the peaks of the relief, for example obtained using linear regression. Step 2124 may be carried out by the data processing means. Thus, at the end of step 2124, a processed relief of the reference ground surface is obtained, for example in the form of data corresponding to the measurements taken of the relief of the reference ground surface after data processing. The method may involve displaying and/or depicting the processed reference ground surface relief, for example on a terminal. An example of a processed reference ground surface relief corresponding to a surface, obtained in step 2124, is illustrated in FIG. 5b.

It is for example thus possible to obtain the profilometry that it is sought to reproduce on the ground surface.

Figure 5C:
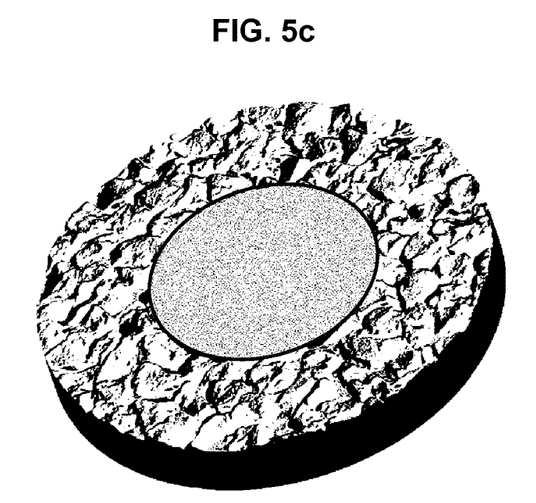

Step 212 may comprise a step 2125 of converting the relief of the reference ground surface, for example measured in step 2123 and/or processed in step 2124, into a solid. Step 2125 may involve transforming the reference ground surface relief from a two-dimensional depiction into a three-dimensional depiction, for example transforming it into a three-dimensional file. Step 2125 may be carried out by the data processing means. Thus, at the end of step 2125, a converted relief of the reference ground surface is obtained, for example in the form of data corresponding to the measurements taken of the relief of the reference ground surface, potentially after data processing, and after the conversion. The method may involve displaying and/or depicting the converted reference ground surface relief, for example on a terminal. An example of a reference ground surface relief, converted so as to correspond to a solid, obtained in step 2125, is illustrated in FIG. 5c.

Data thus obtained may form a set of instructions to be supplied to a production and/or manufacturing device, for example a machining apparatus, to create the ground surface, particularly the substrate and/or relief.

Step 212 may comprise a step 2126 of recording the relief of the reference ground surface, for example measured in step 2123 and/or processed in step 2124, and/or converted into a solid in step 2125. The recording may be performed on the storage means, for example by means of the data processing means.

Step 212 may comprise a step 2127 of manufacturing a prototype from the recording made in step 2126 and/or from the data obtained in step 2121. The manufacturing may be performed using 3-D printing. The prototype may be made of resin. It is thus possible to validate the relief obtained via step 212.

Step 21 may comprise a step 213 of generating a relief of the substrate 110, for example a first relief of the substrate, for example the macro-relief. The relief of the substrate may be generated according to the relief that is to be reproduced, determined in step 212, for example recorded in step 2126.

The relief may be generated in step 213 by the removal of material, for example using an ablation technique.

The relief may be generated by machining.

The relief may be generated by laser, for example by laser machining. The relief may be generated by laser machining, for example continuous or pulsed laser machining, for example using nanosecond laser machining, for example with a beam diameter focused on the surface of between 10 and 100 μm, for example between 25 and 35 μm, for example of the order of 30 μm. The relief may be produced by laser machining of a workpiece, for example a solid lump.

The workpiece may be a metallic workpiece, particularly a solid metal lump, for example containing a steel, for example a stainless steel, for example an X4CrNiMoN21-9-4 stainless steel. The solid metal lump may be a solid lump of steel, for example stainless steel, for example an X4CrNiMoN21-9-4 stainless steel.

The workpiece may contain a carbide, for example a tungsten carbide. The workpiece may be a solid lump of carbide, for example of tungsten carbide.

The workpiece may have overall dimensions of the order of those of the finished component and/or may be smooth and/or may have a thickness greater, at least one order of magnitude greater, than the intended depth of the texture, for example by approximately one order of magnitude.

Such machining thus allows the relief to be formed by ablation of material. This technique is particularly advantageous for generating a ground surface representative of a road surface made of fresh asphalt, particularly with regard to the coefficient of grip between rubber and the ground surface when wet.

The relief may be generated by machining by the removal of material using a cutting tool, the cutting tool having, for example, a cutting edge.

The relief may be generated in step 213 using additive manufacturing.

The relief may be generated by printing, for example by 3-D printing. The relief may be generated in ceramic. Such a step 213 may comprise one or several steps of depositing ceramic powder and/or firing. Such a technique may make it possible to generate the substrate in its entirety.

The relief may be generated by surface laser melting, for example from a powder, for example a powdered steel, for example stainless steel, for example X4CrNiMoN21-9-4 stainless steel. Such a technique may make it possible to generate the substrate in its entirety.

The relief thus generated may be the definitive relief of the substrate 110 of the ground surface. Alternatively, the method may involve modifying the relief generated in step 213.

The method, for example step 21, may thus comprise a step 214 of modulating the relief generated, for example of modulating the roughnesses, for example modulating the amplitude, for example of micro-reliefs or micro-roughnesses, of the relief generated in step 213, for example so as to obtain a second relief on the substrate. The method, for example step 21, may thus comprise a step 214 of attenuating the relief generated, for example of attenuating the roughnesses, for example reducing the amplitude, for example of micro-reliefs or micro-roughnesses, of the relief generated in step 213. Alternatively or in addition, the method, for example step 21, may thus comprise a step 214 of amplifying the relief generated, for example of amplifying the roughnesses, for example increasing the amplitude, for example of micro-reliefs or micro-roughnesses, of the relief generated in step 213.

In that case, the relief generated in step 213 is a first relief modified in step 214 in the context of the manufacture of the ground surface. The roughnesses modulated are, for example, micro-reliefs and/or micro-roughnesses. The micro-relief may be defined for example with respect to the macro-relief, the macro-relief being greater in amplitude than the micro-relief. Alternatively or in addition, the micro-relief may be defined as being a relief of a size smaller than 100 μm. Alternatively or in addition, the micro-relief may be defined as being the relief of a size smaller than the precision permitted by the relief-generating technique used in step 213, for example machining or ablation, particularly laser machining or ablation, for example that can be measured with the texture mean depth measurement precision, for example as described hereinbelow, but which cannot be mastered using the relief-generating technique used in step 213. What is meant by micro-roughnesses are, for example, reliefs of which the wavelength is shorter than the smallest roughness described by the relief recorded in step 2127 and/or the relief data obtained in step 2121, and/or smaller than the precision permitted by the relief-generating technique used in step 213, for example by machining or ablation, particularly laser machining or ablation. It is thus possible to get close to the micro-reliefs measured on the ground surfaces that are to be reproduced in the laboratory, for example road surfaces.

The modulation may be performed using a laser. Step 214 may thus comprise a first step 2141 of modulation using surface laser melting. It is thus possible to re-melt the surface of the relief, for example in order to modulate the local roughnesses thereof. Step 214 may comprise a second step 2142 of femtosecond pulsed laser modulation, for example after or as an alternative to the first step 2141. Step 214, preferably steps 2141 and/or 2142, is preferably carried out after a step 212 in which the relief is generated by additive manufacturing, particularly by 3-D printing.

Thus, at the end of step 21, the relief of the substrate 110 is obtained. The relief of the substrate may define or correspond to the relief of a working surface 120 as described hereinbelow. That part of the substrate 110 on which the relief is situated may at least partially or fully form the working surface 120. Alternatively, a treatment as described hereinbelow, for example such as the creation of a surface coating may be applied to the relief, for example so as to at least partially or fully form the working surface 120. In that case, the working surface is at least partially arranged on top of the relief of the substrate 110.

Surface Treatment

The method may comprise a surface treatment step 22. The step 22 may comprise a step 222 of obtaining, for example of forming, for example of depositing, a surface coating 122, for example containing amorphous carbon and/or titanium nitride and/or chromium nitride, for example made of amorphous carbon and/or titanium nitride and/or chromium nitride and/or tungsten carbide. The surface coating may be a surface coating as described hereinbelow.

It is thus possible to increase the surface hardness, for example the hardness on a working surface, for example as described hereinbelow. It is thus possible to offer high resistance to polishing.

Step 22 is preferably implemented when step 213 of generating the relief has been achieved by surface laser melting and/or by nanosecond laser machining of a solid lump of stainless steel.

The method may be performed in such a way that the material chosen for the substrate guarantees a high level of hardness without a surface coating, preferably when application means 312 as described hereinbelow comprise a motor designed to set the component 32 in relative motion.

Validation

The method may comprise a step 23 of validating the ground surface obtained in step 21 and/or 22. The validation may be performed under conditions of dry and/or wet friction. The validation may comprise a measurement using a tribotester, particularly a linear tribotester, and/or using a rolling device. The validation may involve comparing the measurement against a friction curve.

Ground Surface

Figure 1A:
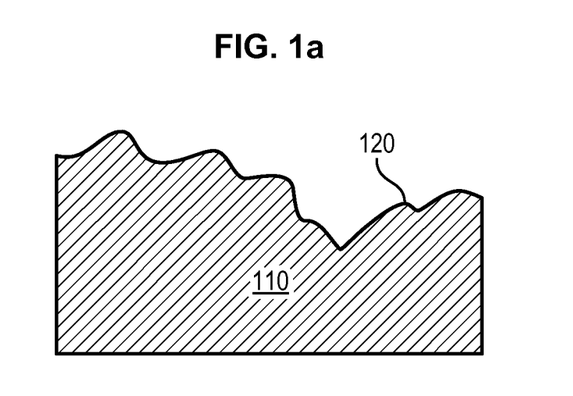
FIGS. 1a and 1b depict ground surfaces according to exemplary embodiments of the invention.
Figure 1B:
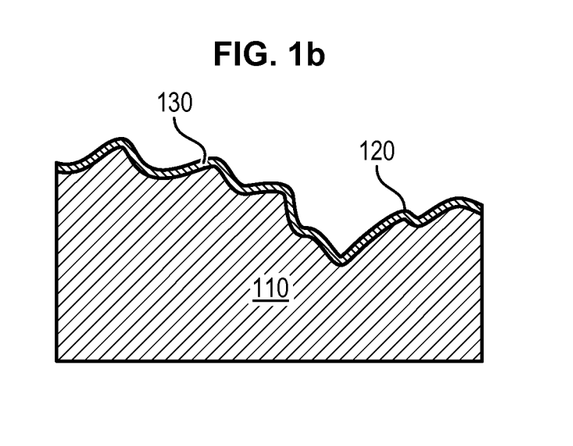

A ground surface is described with reference to FIGS. 1a and 1b. The ground surface is, for example, a test ground surface, for example for testing a component, for example a ground surface for testing a tyre and/or part of a tyre and/or rubber.

The ground surface comprises a substrate 110. The substrate 110 has a Young's modulus of between 100 and 1000 GPa, preferably between 100 and 500 GPa. Such a Young's modulus is very much higher than that of a rubber, which is at most from 3 to 10 GPa, for example in compression in the vitreous domain. Such a Young's modulus also exceeds that of aluminium. Thus, even over the course of use, the rubber remains very much more deformable than the substrate which, by comparison, does not deform.

The ground surface comprises a working surface 120. The working surface may be a surface of the substrate 110 and/or of a surface coating as described hereinbelow. The ground surface has, on the working surface 120, a Vickers hardness of between 1300 and 10 000 kgf/mm$^2$, preferably between 1500 and 3500 kgf/mm$^2$, and/or the ground surface comprises a surface coating forming the working surface, in which the surface coating contains amorphous carbon and/or titanium nitride and/or chromium nitride and/or tungsten carbide. The working surface thus allows the ground surface to achieve high levels of hardness.

"kgf" means kilograms force, and 1 kgf=9.80665 N.

It is thus possible to obtain a ground surface which has the desired characteristics, for example those of a road surface, and which can be tested repeatedly while maintaining its friction characteristics despite such repeated use, thereby making it possible to ensure the relevance of the tests performed. Such a ground surface is particularly effective for testing grip characteristics, for example on dry ground and/or wet ground.

The ground surface is obtained for example using the manufacturing method described hereinabove.

Furthermore, such a ground surface may also be effective for testing tyre/ground surface force characteristics, for example using a test device as described hereinafterbelow, for which characteristics the known ground surfaces are either incapable of achieving a topography representative of a road surface, or exhibit excessive wear requiring the ground surfaces to be changed too frequently. Unlike the known ground surfaces, it is thus possible to avoid both problems with cost and problems with repeatability.

Specifically, the ground surfaces of the prior art that are used in laboratories do not reproduce the characteristics of a road surface and/or wear prematurely, thereby detracting from the repeatability of the tests conducted using the ground surfaces of the prior art.

One of the mechanisms whereby a tyre grips on wet ground stems from the deformation of the rubber which slips on the ground. Because of the viscoelasticity of the material of the tyre, this deformation leads to a dissipation of energy which correlates directly with the friction forces. Knowledge and control of the roughness of the ground surface is therefore of critical importance in ensuring the relevance of the friction measurements in the laboratory compared with the grip measurements on the complete tyre on a braking track.

Road surfaces are generally made up of a bituminous binder and chippings of crushed rocks the petrographical nature and size of which can vary from one ground surface to another. In terms of roughness, road surfaces are distinguished by their multi-scale nature (characteristic roughness size ranging from 1 cm to 1 μm or even less) and their quasi-fractal structure.

One of the difficulties overcome by the ground surface described here, making it possible to improve the relevance of the laboratory measurement, is that it guarantees that the roughness of the ground surface against which the rubber is rubbing during a test is indeed representative of the characteristics of a road surface. In this respect, it is possible here to define the term dynamic length as being the cumulative length of rubber slipping over a point on the ground. In real-life contact between the rubber of a tyre and a road surface of a braking track that is used intensively, the dynamic length experienced by a point on the ground during two years of use of the braking track is of the order of ten metres or so. By contrast, in the laboratory, characterizing numerous operating points of the rubber (pressure, speed, temperature), combined with the fact that the friction occurs always at the same spot, causes a point on the ground surface to experience dynamic lengths that are far higher, by several orders of magnitude (approximately 10 km by chippings in one year of lab use). This results in a manifestation of the phenomena of polishing/erosion of the rock that occurs far more rapidly in the laboratory than on outdoor tracks. This is manifested in laboratory grip levels that are systematically lower than on outdoor tracks and that vary greatly over the life of the ground surface.

The current state of the art demonstrates that no natural rock is able to limit the polishing mechanism and maintain grip levels comparable with those of outdoor tracks.

The ground surface described here, and which can be obtained by means of the method described hereinabove, because of the elastic modulus of the substrate and the hardness of its working surface and/or the surface coating material, allows these disadvantages to be overcome.

The substrate 110 may comprise or be formed of a solid lump, for example a solid lump of metal. The substrate 110 may comprise steel, for example stainless steel, for example X4CrNiMoN21-9-4 stainless steel, and/or austenitic stainless steel, for example X2CrNi18-9 stainless steel, and/or carbide, for example tungsten carbide, and/or ceramic, for example zirconia ceramic, for example zirconia Zr700. The substrate 110 may comprise or be formed of and/or consist of a solid steel lump, for example made of stainless steel, for example X4CrNiMoN21-9-4 stainless steel, and/or austenitic stainless steel, for example X2CrNi18-9 stainless steel, tungsten carbide, and/or ceramic, for example zirconia ceramic, for example zirconia Zr700.

The ground surface may, on its working surface 120, have a Vickers hardness of between 1300 and 10 000 $kgf/mm^2$, preferably between 1500 and 3500 $kgf/mm^2$.

The ground surface may comprise a surface coating 130. It is thus possible to increase the surface hardness, particularly the hardness on the working surface. It is thus possible to offer high resistance to polishing.

The surface coating 130 may have a thickness of between 0.1 and 100 μm, preferably between 2 and 5 μm, preferably of 3 μm. The thickness of the coating can thus be chosen so that it does not alter the amplitude of the roughnesses, and so that it therefore does not modify the friction response of the substrate.

The surface coating 130 may comprise or consist of amorphous carbon (diamond-like carbon) and/or titanium nitride and/or chromium nitride and/or tungsten carbide.

The surface coating 130 may comprise the working surface 120.

The working surface 120 may form a test surface. The working surface 120 may be designed so that the component that is to be tested is pressed onto it.

The working surface 120 may have a relief as described hereinabove.

The mean texture depth on the working surface 120 may be comprised between 0.3 and 1.7 mm, for example 1 mm. The mean textured depth is established in accordance with European Commission Regulation (EU) No 228/2011 of 7 Mar. 2011, Annex V 3.1(4).

The coefficient of grip between a rubber and the ground surface on the working surface 120 may be comprised between 0.5 and 2. Such a grip coefficient is measured for example using a steady-stage linear friction test under wet conditions, for example under conditions in which the working surface 120 and/or the ground surface is bathed in water, for a cumulative slip length, or dynamic length, of 100 mm, at 4 bar, for a speed of 1 m/s, at a water temperature of 25° C. The cumulative slip length or dynamic length is the amount of relative displacement of two surfaces, for example those of the rubber and of the ground surface, cumulated in the plane of reference of the ground surface.

The rubber for establishing the grip coefficient may be a rubber that has a composition representative of the rubbers used in the tyre tread compound.

The rubber for establishing the grip coefficient may be characterized by a loss factor $tan(\delta)$ and a complex modulus $G^*$.

The dynamic property $max(tan(\delta))$ is measured for example on a viscosity analyser 5 (Metravib VA4000) according to Standard ASTM D 5992-96. The measurement involves recording a response of a sample of vulcanized composition (for example a cylindrical test specimen with a thickness of 4 mm and a cross section of 400 $mm^2$), subjected to a simple alternating sinusoidal shear stress, at a frequency of 10 Hz, under standard temperature conditions (for example 23° C.) according to the standard ASTM D 1349-99. The response recorded is then subjected to a peak-to-peak strain amplitude sweep from 0.1% to 50% (outward cycle) and then from 50% to 1% (return cycle). The result made use of is the loss factor $tan(\delta)$. For the return cycle, the maximum value of $tan(\delta)$ observed $max(tan(\delta))$ is indicated.

The complex modulus is measured for example in the following way. The measurement involves recording a response of a sample of vulcanized composition subjected to a simple alternating sinusoidal shear stress during a temperature sweep; subjected to an imposed sinusoidal stress of 0.7 MPa and at a frequency of 10 Hz, the temperature ranging from −60° C. to 100° C., at a rate of 1.5° C. per minute. The temperature for the maximum value of $tan(\delta)$ for the rubber for the response recorded, denoted "Tg (° C.) $max(tan(\delta))$". Another result made use of is the complex dynamic shear modulus ($G^*$), for example at 60° C. For greater readability, the $G^*$ results will be shown in base 100, the value 100 being assigned to the control. A result of less than 100 indicates a decrease in the value concerned and, conversely, a result of greater than 100 will indicate an increase in the value concerned.

The working surface, for example the ground surface, may have a shape comprising at least one curved portion, for example an arc of a circle. The working surface, for example the ground surface, may have a shape comprising at least one closed curve, for example a circle. The ground surface may thus form a rolling-road drum.

The working surface, for example the ground surface, may have a shape comprising at least one portion that forms a belt, for example the form of a belt joined up on itself, for example the form of a caterpillar track. Such a working surface or such a ground surface may be used by means of a rolling device of the "flat track" type as described hereinbelow.

The ground surface may form a test specimen. The ground surface may have dimensions suited to forming a test specimen suitable for use by a test device as described hereinbelow.

Device

A device 31 for testing a component 32 is described with reference to FIG. 3. The device 31 comprises a ground surface 1 as described hereinabove. The device 31 comprises means 312 for pressing the component 32 against the ground surface 1, for example pressing the component 32 against the working surface 120, and/or for setting in place a relative movement of the component 32 and of the ground surface 1.

The pressing means 312 may comprise an applicator designed to press the component 32 against the ground surface 1. The applicator may comprise an arm.

The movement may be a rectilinear movement or a rotational movement. The movement may be a movement of the ground surface, with the component 32 remaining stationary.

The pressing means 312 may comprise a motor and/or a shaft and/or an arm designed to bring about a relative movement between the component 32 and the ground surface.

The component 32 may be or comprise a tyre and/or part of a tyre and/or a rubber. The component 32 may be or comprise at least a portion of a wheel, for example a wheel.

The pressing means 312 may be designed to regulate a speed of the component 31 with respect to the ground surface, for example a speed of linear travel or a speed of annular travel, for example a rotational speed. The speed may be comprised between 0.5 and 1.5 m/s, for example between 0.9 and 1.2 m/s.

The device may comprise temperature control means can control the ambient temperature and/or the initial temperature of the component 31. The device and/or an assembly or a system comprising the device may comprise the temperature control means. The temperature control means may comprise a temperature control device, for example a thermostat, for example a heater, for example a resistive element, and/or a cooling device. The device is configured for example to control the temperature in such a way as to keep it between 20 and 30° C., for example at 25° C.

The device may comprise means for measuring at least one physical quantity, for example one or more physical quantities. The measurement means may comprise a measurement sensor for sensing at least one physical quantity, for example a force and/or a moment.

The device may comprise data processing means, for example a data processing unit, for example a processor. The data processing means are for example the same as those already described in the context of the manufacturing method and/or the same as those described in the context of the method of use below.

The device 31 may be a tribotester, for example a linear tribotester or tribotester having a rotation configuration or a rotary tribotester.

The pressing means 312 may be designed to apply a load normal to the ground surface, for example normal to a midplane, for example normal to a midplane corresponding to the working surface, for example so as to control a mean contact pressure between the component 32 and the ground surface.

The pressing means 312 are designed for example to move the component 31 tangentially with respect to the ground surface, for example to the working surface. When the tribotester is a linear tribotester, the movement may be a rectilinear translational movement. Alternatively, when the tribotester is a rotary tribotester, the movement may follow an annular path, for example may be a rotation.

The measurement means may be designed to measure a force, particularly a tangential force. The physical quantity or quantities, for example the force, may be measured at the interface between the component 32 and the ground surface.

The device, for example the data processing means, may be designed to determine at output a dimensionless coefficient of friction by norming the tangential force with the normal force.

The device 31 may be a rolling device. The rolling device may be a device designed to cause the component 32 to roll. The rolling device may be designed to govern the orientation of the component 32, for example the orientation of the midplane of the component 32, for example the orientation of the midplane of the wheel or of the wheel part of the component 32 or that forms the component 32, so as to apply stress loadings to the component 32. Alternatively or in addition, the rolling device may be designed to govern the speed of the component 32 so as to apply stress loadings to the component 32. Alternatively or in addition, the rolling device may be designed to govern the torque applied to the component 32, for example at the centre of the component 32, for example at the centre of the wheel or of the wheel part of the component 32.

The means 312 may be designed to apply a force to the component 32 on the ground surface, for example a force of an intensity that increases over time, for example until a setpoint force value is reached.

The measurement means may be designed to measure a force and/or a moment. The at least one physical quantity, for example the force, may be measured at the centre of the component, for example at the centre of the wheel of the component 32.

The device, for example the data processing means, may be designed to determine the grip of the component with respect to the ground surface, for example by measuring the force and/or the moment measured by the measurement means.

The rolling device may be a rolling device of the "flat-track" type. With such a rolling device, the working surface, for example the ground surface, may have a form that comprises at least a portion that forms a belt as described hereinabove.

Method of Use

A method for testing the component is described with reference to FIG. 4. The component may be tested by means of the device 31.

The method may comprise a step 41 of pressing the component 32 against the ground surface 1.

The method may comprise a step 42 of measuring the behaviour of the component 32 on the ground surface 1, particularly on the working surface 110.

Rolling Device

The device is or comprises for example the rolling device as described hereinabove.

Step 41 may be implemented without relative and/or absolute rotation of the component and/or of the ground surface. Step 41 may then involve applying a force to the component 32 on the ground surface, for example a force that increases in intensity over time, for example until a setpoint force value is reached.

Alternatively or in addition, in another step 41 of pressing the component onto the ground surface, step 41 may involve setting the ground surface in rotation with respect to the component, for example so that the ground surface drives the component in rotation so that the ground surface and the component are each rotating in the frame of reference of the laboratory. The rotation of the component 32 may be regulated, in terms of torque and/or in terms of slip rate, for example according to a control setpoint. The control setpoint may involve a zero-torque setpoint or non-zero setpoint at a predetermined value. The control setpoint may involve a zero-slip setpoint or non-zero setpoint at a predetermined value.

Alternatively or in addition, in another step 41 of pressing the component onto the ground surface, a level of animation may be applied to the component 32, for example a variation in slip angle of the component with respect to the ground surface and/or a variation in camber angle of the component with respect to the ground surface and/or a variation in load and/or a variation in slip rate.

Step 42 may involve measuring one or more force(s) and/or one or more moment(s), for example at the centre of the wheel when the component 32 comprises a wheel as described hereinabove.

The method may involve obtaining the grip of the component with respect to the ground surface, for example using the processing means, for example from the force and moment measurements.

Tribotester

The device is or comprises for example the tribotester as described hereinabove.

Step 41 may involve applying a force normal to the ground surface, for example normal to a midplane, for example normal to a midplane corresponding to the working surface, for example so as to control a mean contact pressure between the component 32 and the ground surface.

Step 41 may involve pressing the component 31 tangentially with respect to the ground surface, for example to the working surface. When the tribotester is a linear tribotester, the movement may be a rectilinear translational movement. Alternatively, the movement may follow an annular path, for example may be a rotation.

Step 41 may involve controlling the ambient temperature and/or the initial temperature of the component 31. The device and/or an assembly or a system comprising the device may comprise the temperature control means.

Step 42 may involve measuring a force, particularly a tangential force. The at least one physical quantity, for example the force, may be measured at the interface between the component 32 and the ground surface.

The method may involve determining at output a dimensionless coefficient of friction by norming the tangential force with the normal force, for example using the processing means.

Detailed Example

Figure 6:
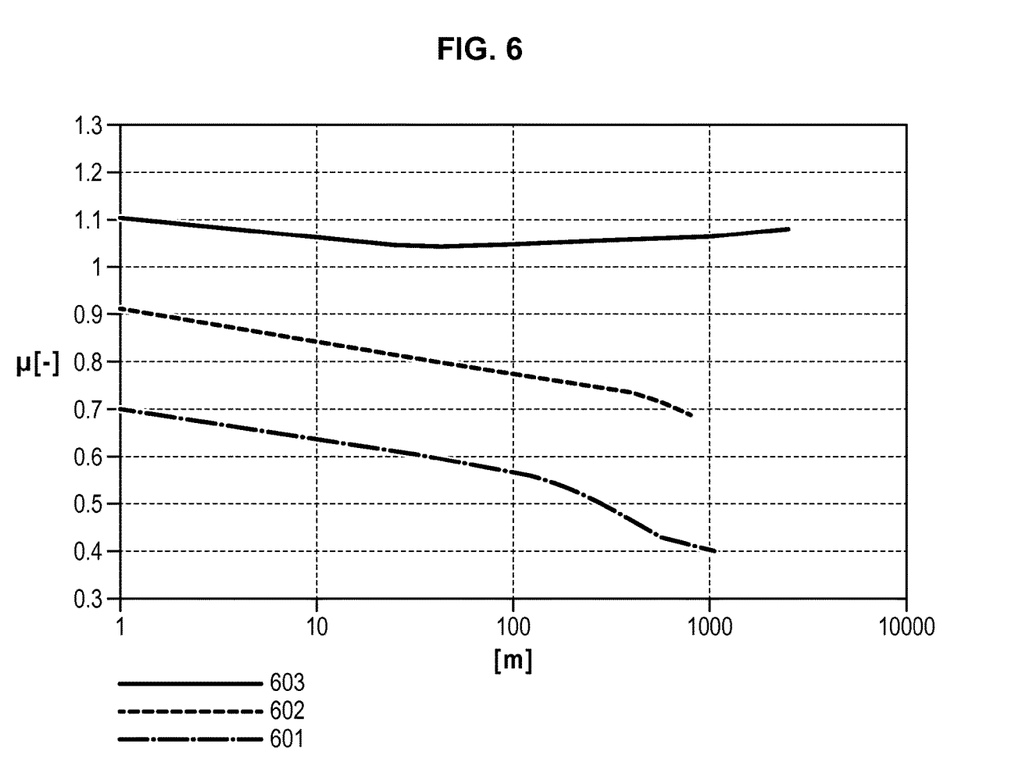
FIG. 6 depicts measurements of the coefficient of friction as a function of the dynamic length according to one exemplary embodiment of the invention.

A detailed example employing a test ground surface is described with reference to FIG. 6.

The substrate of the ground surface is metal, made of X4CrNiMoN21-9-4 stainless steel, the relief of which has been generated by pulsed laser machining from a solid lump, for example using nanosecond pulsed laser machining.

The surface coating of the ground surface is made of approximately 3 µm amorphous carbon.

The relief reproduced corresponds to a reference ground surface.

For the test ground surface, only the ring of the reference ground surface comprised between a radius of 30 mm and a radius of 46 mm is textured in such a way as to exhibit the relief.

The surface of the reference ground surface has been converted beforehand into a solid and recorded to allow the manufacture of the test ground surface.

The way in which the test ground surface evolves with friction is tested using a tribotester. FIG. 6 depicts the change in maximum normalized coefficient of friction as a function of the dynamic length in m, on a logarithmic scale, at a speed of 1.2 m/s, a pressure of 4 bar, and an ambient temperature of 25° C.

The observations of the test ground surface undergoing friction are made at various stages of polishing, for totaled dynamic lengths (1, 25, 250, 1000, 2500 m). Running-in is performed at a single operating point (4 bar, 1.2 m/s, 25° C.).

The test ground surface offers a very high normalized coefficient of friction ($\mu$), even at very high cumulative dynamic or slip lengths.

Furthermore, the test ground surface changes very little visibly during measurement.

The presence of the amorphous carbon coating does not appreciably modify the reliefs and improves the performance aspect of resistance to polishing.

Curves 601 and 602 represent the change observed on a running-in ground surface made of grit. Curve 603 of the test ground surface is rigorously insensitive to polishing.

The invention claimed is:

1. A ground surface comprising:
   a substrate having a Young's modulus of between 100 and 1000 GPa, the substrate having a relief having a mean texture depth,
   wherein the ground surface has, on a working surface thereof, a Vickers hardness of between 1300 and 10,000 kgf/mm$^2$, and
   wherein the mean texture depth is between 0.3 mm and 1.7 mm.

2. The ground surface according to claim 1 further comprising a surface coating which defines the working surface.

3. The ground surface according to claim 2, wherein the surface coating comprises amorphous carbon, titanium nitride, chromium nitride, tungsten carbide, or any combination thereof.

4. The ground surface according to claim 2, wherein the surface coating has a thickness of between 0.1 and 100 µm.

5. The ground surface according to claim 1, wherein the substrate has a Young's modulus of between 100 and 500 GPa, and the ground surface has, on the working surface, a Vickers hardness of between 1500 and 3500 kgf/mm$^2$.

6. The ground surface according to claim 1, wherein the substrate comprises stainless steel, tungsten carbide, ceramic, or any combination thereof.

7. The ground surface according to claim 1, wherein a coefficient of grip between a rubber and the ground surface on the working surface is between 0.5 and 2.

8. A test device for testing a component, the test device comprising:
   the ground surface according to claim 1; and
   means for pressing the component against the ground surface or for creating relative movement between the component and the ground surface.

9. The test device according to claim 8, wherein the test device is a rolling device.

10. The test device according to claim 8, wherein the device is a tribotester.

11. A ground surface comprising a substrate having a Young's modulus of between 100 and 1000 GPa and a surface coating formed directly on the substrate and defining a working surface,
    wherein the surface coating comprises amorphous carbon, titanium nitride, chromium nitride, tungsten carbide or any combination thereof, and
    wherein a mean texture depth of a relief of the substrate on the working surface is between 0.3 and 1.7 mm.

12. A method for manufacturing a ground surface, the method comprising:
    forming a relief having a mean texture depth in a surface of a substrate, the substrate having a Young's modulus of between 100 and 1000 GPa,
    wherein the ground surface has, on a working surface thereof, a Vickers hardness of between 1300 and 10,000 kgf/mm$^2$, and
    wherein the mean texture depth is between 0.3 mm and 1.7.

13. The method according to claim 12, wherein forming the relief comprises forming the relief on the substrate by additive manufacturing using ceramic.

14. The method according to claim 12, wherein forming the relief comprises forming the relief by machining.

15. The method according to claim 14, wherein forming the relief by machining comprises laser machining of a solid lump containing tungsten carbide.

16. The method according to claim 14, wherein forming the relief by machining comprises laser machining of a solid lump containing stainless steel.

17. The method according to claim 12, wherein forming the relief comprises forming the relief by surface laser melting using a stainless steel powder.

18. The method according to claim 12, further comprising forming a surface coating that defines the working surface on the substrate.

19. A test method for testing a component using the test device according to claim 8, the test method comprising:
    pressing the component onto the ground surface or creating relative movement between the component and the ground surface.

\* \* \* \* \*